United States Patent
McMillan et al.

(10) Patent No.: US 10,673,297 B2
(45) Date of Patent: Jun. 2, 2020

(54) IMPACT RESISTANT ELECTRIC MOTOR

(71) Applicant: McMillan Electric Company, Woodville, WI (US)

(72) Inventors: Douglas deHaas McMillan, Hudson, WI (US); Ronald James Boltik, Lakeland, WI (US); Vincent Hall, Elk Mound, WI (US); Dewain Wasson, Hudson, WI (US)

(73) Assignee: McMillan Electric Company, Woodville, WI (US)

( * ) Notice: Subject to any disclaimer, the term of this patent is extended or adjusted under 35 U.S.C. 154(b) by 69 days.

(21) Appl. No.: 15/837,417

(22) Filed: Dec. 11, 2017

(65) Prior Publication Data

US 2019/0181715 A1   Jun. 13, 2019

(51) Int. Cl.
| | |
|---|---|
| *H02K 5/04* | (2006.01) |
| *H02K 13/00* | (2006.01) |
| *H02K 23/04* | (2006.01) |
| *A63B 21/00* | (2006.01) |
| *A63B 22/02* | (2006.01) |
| *A63B 21/005* | (2006.01) |
| *A63B 21/22* | (2006.01) |
| *H02K 5/14* | (2006.01) |
| *H02K 5/15* | (2006.01) |
| *H02K 5/173* | (2006.01) |
| *H02K 7/02* | (2006.01) |

(52) U.S. Cl.
CPC ........... *H02K 5/04* (2013.01); *A63B 21/0058* (2013.01); *A63B 21/00192* (2013.01); *A63B 21/225* (2013.01); *A63B 22/025* (2015.10); *H02K 5/143* (2013.01); *H02K 5/148* (2013.01); *H02K 5/15* (2013.01); *H02K 5/1732* (2013.01); *H02K 13/006* (2013.01); *H02K 23/04* (2013.01); *H02K 7/02* (2013.01); *H02K 2205/03* (2013.01); *H02K 2213/03* (2013.01)

(58) Field of Classification Search
CPC ............................ H02K 5/1732; H02K 7/083
See application file for complete search history.

(56) References Cited

U.S. PATENT DOCUMENTS

| | | | |
|---|---|---|---|
| 2,967,346 A | 1/1961 | McMaster et al. | |
| 3,114,060 A | 12/1963 | Goettl | |
| 4,042,036 A | 8/1977 | Smith et al. | |
| 4,870,310 A | 9/1989 | Triplett | |
| 5,102,307 A | 4/1992 | Meyer | |
| 5,229,676 A * | 7/1993 | Bood | F16C 19/52 310/114 |
| 5,272,803 A | 12/1993 | Harrison et al. | |
| 5,357,160 A | 10/1994 | Kaneda et al. | |
| 5,755,518 A | 5/1998 | Boutaghou | |

(Continued)

FOREIGN PATENT DOCUMENTS

| | | |
|---|---|---|
| CN | 2150662 Y | 12/1993 |
| WO | 2013/139265 A1 | 9/2013 |

*Primary Examiner* — Dang D Le
(74) *Attorney, Agent, or Firm* — Merchant & Gould P.C.

(57) ABSTRACT

Electric motors and machines including such electric motors, the electric motors having improved impact resistance. Features of the electric motors minimize axial shifting of the motor shaft and other components of the electric motor, and/or minimize damage to components caused by such axial shifting occasioned by an impact force on the motor.

8 Claims, 15 Drawing Sheets

(56) References Cited

U.S. PATENT DOCUMENTS

| | | | |
|---|---|---|---|
| 5,969,448 A | 10/1999 | Liu et al. | |
| 6,107,717 A | 8/2000 | Lin et al. | |
| 6,417,595 B1 | 7/2002 | Wasson | |
| 6,628,028 B2 | 9/2003 | Yoshida et al. | |
| 6,710,489 B1 | 3/2004 | Gabrys | |
| 6,844,636 B2 | 1/2005 | Lieu et al. | |
| 7,205,690 B2 | 4/2007 | Hatano et al. | |
| 7,237,962 B2 | 7/2007 | Zernikow et al. | |
| 7,531,938 B2 | 5/2009 | McMillan et al. | |
| 7,538,461 B2 | 5/2009 | McMillan et al. | |
| 7,563,204 B2 * | 7/2009 | Wasson | A63B 21/225 416/60 |
| 9,624,998 B2 | 4/2017 | Dhaens | |
| 2005/0017585 A1 * | 1/2005 | Simpson | H02K 5/1672 310/89 |
| 2008/0152270 A1 | 6/2008 | Engesser et al. | |
| 2009/0001835 A1 | 1/2009 | Kojima et al. | |
| 2009/0080823 A1 | 3/2009 | Bauch et al. | |
| 2013/0022303 A1 | 1/2013 | Spierling | |

* cited by examiner

IMPACT RESISTANT ELECTRIC MOTOR

RELATED APPLICATIONS

The disclosures of the following patents are hereby incorporated by reference in their entirety: U.S. Pat. Nos. 6,417,595; 7,531,938; 7,538,461; and 7,563,204.

BACKGROUND

Direct current (DC) electric motors commonly include a housing that holds an armature surrounding a torque shaft. The shaft axially extends through front and back covers of the housing. A commutator is coupled to the wiring of the armature. A flywheel assembly can be coupled to the armature shaft to maintain rotational speed of the motor by virtue of the inertia of the flywheel. Bearings on the shaft can facilitate rotation.

When the motor is subjected to an impact force, e.g., when the motor is dropped, components of the motor can shift, causing damage to the motor.

SUMMARY

The present disclosure relates generally to an electric motor. More particularly, the present disclosure relates to an electric motor having one or more features adapted to minimize damage to the motor occasioned by an impact force on the motor.

According to certain aspects, the present disclosure relates to an electric motor having a front cover and a rear cover, a housing disposed between the front cover and the rear cover and containing an armature, the motor further comprising a shaft rotatably mounted about a rotation axis of the electric motor that passes through the front cover and the rear cover, a front force dissipation component coupled to the shaft forward of the front cover, a front bearing radially surrounding the shaft, and a rear bearing radially surrounding the shaft, wherein a first spacing defined as a smallest axial distance between the rear bearing and the rear cover rearward of the rear bearing is greater than a second spacing defined as a smallest axial distance between the front force dissipation component and the front cover rearward of the front force dissipation component.

The front force dissipation component can be any structural component that couples to the shaft forward of the front cover. The front force dissipation component can absorb an impact force applied to the motor when, e.g., the front force dissipation component and the front cover contact each other due to a shifting occasioned by the impact force. The front force dissipation component can serve other purposes as well. For example, the front force dissipation component can be a flywheel. Non-limiting examples of a front force dissipation component include, e.g., a flywheel, a snap ring, a sprocket, a nut, or an additional front cover coupled to the shaft forward of the front cover for added protection. In addition, the front force dissipation component can include a plurality of elements and/or an assembly of elements.

According to certain aspects, the present disclosure relates to an electric motor having a front cover and a rear cover, a housing disposed between the front cover and the rear cover and containing an armature, a shaft rotatably mounted about a rotation axis of the electric motor that passes through the front cover and the rear cover, a front force dissipation component coupled to the shaft forward of the front cover, a front bearing radially surrounding the shaft, and a rear bearing radially surrounding the shaft, wherein a first spacing defined as a smallest axial distance between the front bearing and the front cover forward of the front bearing is greater than a second spacing defined as a smallest axial distance between a rear force dissipation component and the rear cover forward of the rear force dissipation component.

According to certain aspects, the present disclosure relates to an electric motor having a front cover and a rear cover, a housing disposed between the front cover and the rear cover and containing an armature, a shaft rotatably mounted about a rotation axis of the electric motor that passes through the front cover and the rear cover, a front force dissipation component coupled to the shaft forward of the front cover, a front bearing radially surrounding the shaft, and a rear bearing radially surrounding the shaft, wherein a first spacing defined as a smallest axial distance between the rear bearing and the rear cover rearward of the rear bearing is greater than a second spacing defined as a smallest axial distance between the front force dissipation component and the front cover rearward of the front force dissipation component, and wherein a third spacing defined as a smallest axial distance between the front bearing and the front cover forward of the front bearing is greater than a fourth spacing defined as a smallest axial distance between a rear force dissipation component and the rear cover forward of the rear force dissipation component.

In some examples, a biasing mechanism such as a compression spring or a wave washer is disposed rearward of the rear bearing such that axial rearward movement of the rear bearing causes compression of the biasing mechanism between the rear bearing and the rear cover.

In some examples, a biasing mechanism such as a compression spring or a wave washer is disposed forward of the front bearing such that axial forward movement of the forward bearing causes compression of the biasing mechanism between the front bearing and the front cover.

In some examples, a rear biasing mechanism such as a compression spring or a wave washer is disposed rearward of the rear bearing such that axial rearward movement of the rear bearing causes compression of the biasing mechanism between the rear bearing and the rear cover; and a front biasing mechanism such as a compression spring or a wave washer is disposed forward of the front bearing such that axial forward movement of the forward bearing causes compression of the biasing mechanism between the front bearing and the front cover.

In some examples, the shaft axially extends through the biasing mechanism.

In some examples, the shaft extends axially through the front and rear biasing mechanisms.

In some examples, the biasing mechanism or rear biasing mechanism is disposed in a cavity defined by the rear cover.

In some examples, the biasing mechanism or front biasing mechanism is disposed in a cavity defined by the front cover.

In some examples, one or more components of the electric motor has an operating position and an axially shifted positioned caused by, e.g., an impact force on the motor.

In some examples, the biasing mechanism(s) is/are adapted to return one or more components of the electric motor to the operating position from the axially shifted position.

In some examples the biasing mechanism(s) applies/apply a pre-load force/pre-load forces on the rear bearing and/or the front bearing when the rear bearing and/or the front bearing is/are in an operating position, the pre-load force(s) being selected to maximize functionality of the rear bearing and/or the front bearing.

In some examples, the electric motor is a direct current (DC) motor.

In some examples, the electric motor is a permanent magnet direct current (PMDC) motor.

In some examples, the electric motor includes a commutator and one or more brush assemblies, each brush assembly including at least a brush and a brush holder that receives the brush, the brushes being engageable with the commutator.

In some examples, an assembly including the commutator is partially received in the rear cover.

In some examples, a partial axial length of the commutator (parallel to the rotation axis) is selected such that the brush assemblies (including any portion thereof) do not engage tangs of the commutator when the armature and/or the commutator axially shift(s) rearwards.

In some examples, a partial axial length of the commutator (parallel to the rotation axis) is selected such that the brush assemblies (including any portion thereof) do not engage tangs of the commutator when the armature and/or the commutator axially shift(s) rearwards by as much as or more than the second spacing, or by as much as or more than the first spacing.

In some examples, the electric motor includes a rear force dissipation component comprising one or more shaft securing elements, e.g., a snap ring/E-ring and/or a washer, disposed within an external recess defined by the rear cover, to assist in minimizing forward axial travel of the shaft due to impact force on the electric motor.

In some examples, an electric motor in accordance with the present disclosure is a component of a machine, such as a treadmill.

According to further aspects of the present disclosure, a treadmill is provided that includes a treadmill belt, a drive roller to drive the treadmill belt, and an electric motor according to one of the example electric motors described herein, the torque shaft of the electric motor being coupled by a drive belt to the drive roller to drive the treadmill belt.

The above summary is not intended to describe each disclosed embodiment or every implementation of the present disclosure. Figures in the detailed description that follow more particularly exemplify embodiments of the disclosure. While certain embodiments will be illustrated and described, the disclosure is not limited to use in such embodiments.

DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
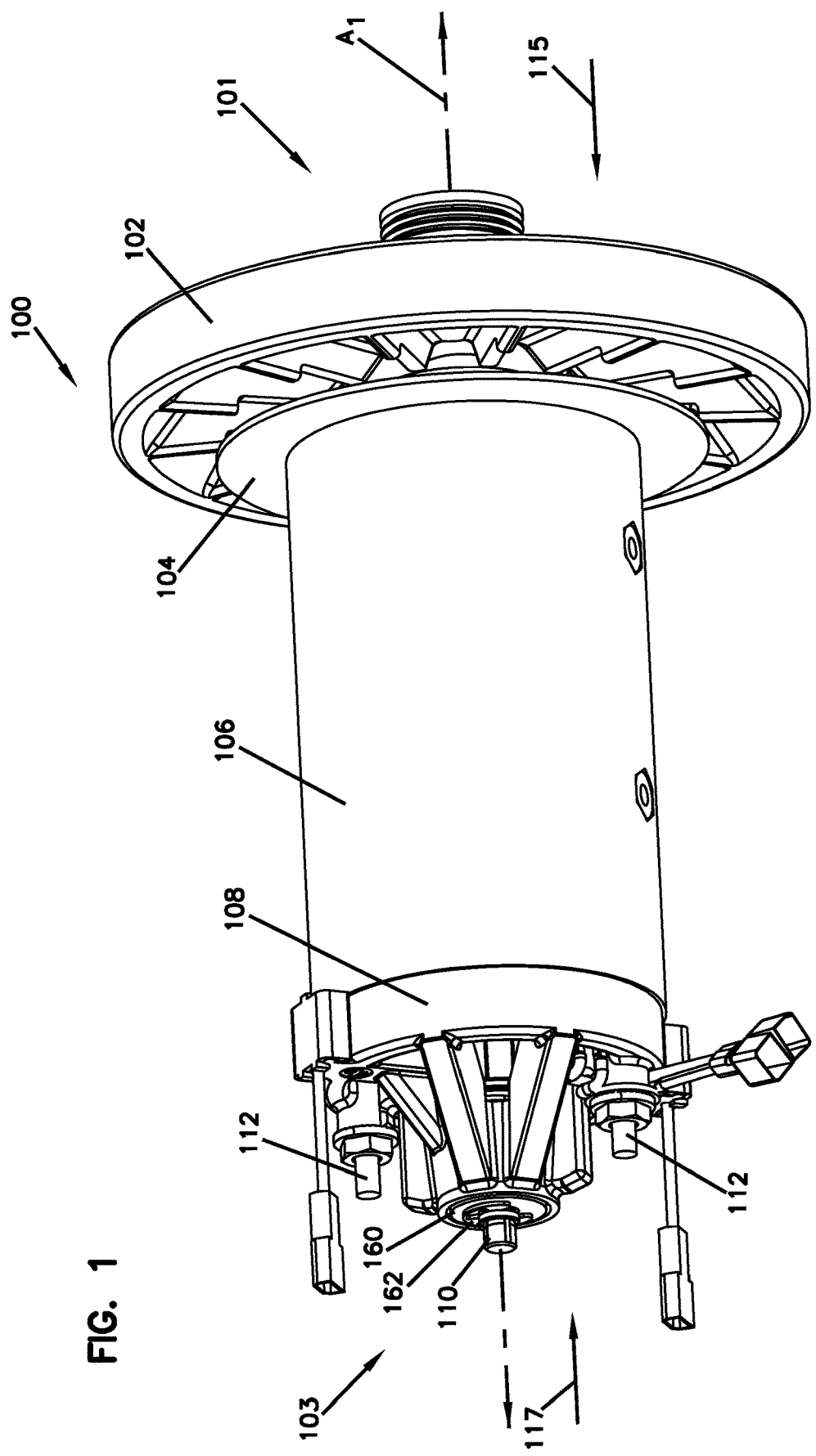
FIG. 1 is a perspective view of an example DC electric motor in accordance with the present disclosure, the motor being in an operational state.
Figure 2:
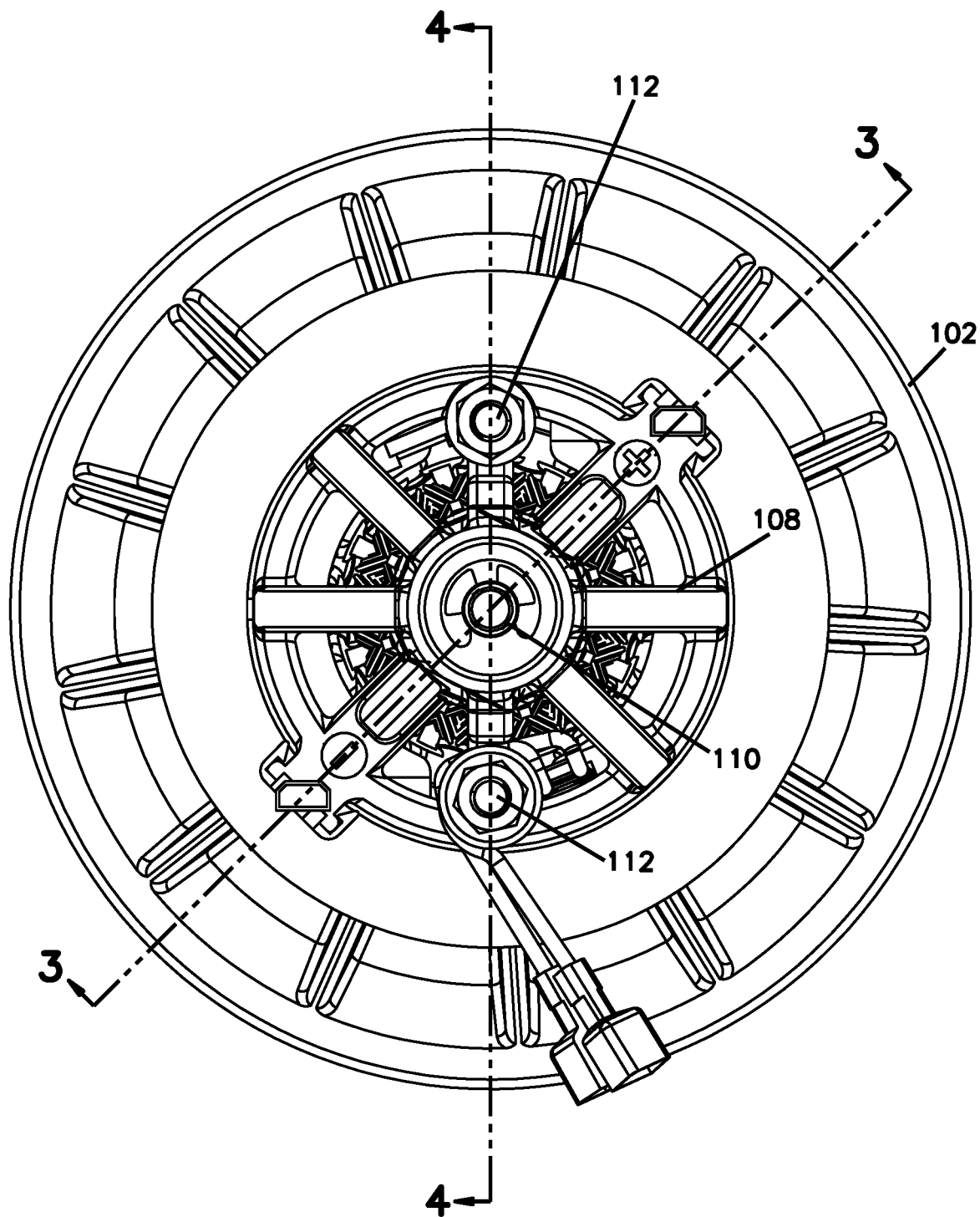
FIG. 2 is a rear end view of the example DC electric motor of FIG. 1.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present disclosure relates to improvements in electric motors. In non-limiting examples, the improvements are directed to direct current (DC) or permanent magnet direct current (PMDC) motors. The motors of the present disclosure can be implemented in any suitable machine, device, or other context. In some non-limiting examples, a PMDC motor in accordance with the present disclosure can be used in a treadmill or other motorized athletic or training equipment.

The present disclosure is directed to features of electric motors that can improve the motors' impact resistance. Non-limiting advantages of these features include impact force dissipation, automatic return of motor components that shift due to impact force to their operational positions, a torque shaft and other internal components that are less susceptible to axial shifting from impact force, and shaft bearings that are not axially fixed in place but rather can axially travel in response to impact force and thereby help to minimize damage.

Referring to FIG. 1, an example electric motor 100 in accordance with the present disclosure is defined by a central axis A1 that runs longitudinally along a torque shaft 110. The motor causes rotation of the shaft 110 about the rotation axis A1. The torque shaft can transmit torque to one or more parts of a machine containing the electric motor 100. Generally, the electric motor 100 is defined by a front end 101 and a back or rear end 103.

The electric motor 100 includes a front cover 104, a rear cover 108 and a housing 106 generally disposed between the front cover 104 and the rear cover 108. A front force dissipation component 102 (in this example, the front force dissipation component 102 is a flywheel) is coupled to the shaft 110 towards the front end of the shaft 110 and forward of the front cover 104. The flywheel 102 is adapted to maintain rotational speed of the electric motor 100 by virtue of the inertia of the flywheel 102. Bolts 112 and/or other fasteners hold varies various components of the electric motor 100 together.

In non-limiting examples, the rear cover 108 is at least partially composed of a thermoset material, and the front cover 104 is at least partially composed of metal, such as steel.

As described in more detail below, the electric motor 100 is adapted to resist damage that would otherwise be attributable to rearward external axial forces in the direction of the arrow 115, as well as forward external axial forces in the direction of the arrow 117.

Referring to FIGS. 2-7, the electric motor 100 includes a pair of permanent magnets 120 and 122 disposed about an armature 124 containing wire windings 126. The armature 124 is disposed axially between the front cover 104 and the rear cover 108. A commutator 128 is disposed axially rearward of the armature 124. External electric current is supplied to the commutator 128 via wires 130 connected to brushes 132, which electrically engage the exterior surface of the commutator 128. The brushes 132 are spring biased towards the commutator with radially directed compression springs 134. Brush assemblies 136 that include the brushes 132, the compression springs 134, and brush holders 135 (which receive the brushes 132) are received in and/or partially integral with the rear cover 108. In the example shown, the brush holders 135 of the brush assemblies 136 are molded integral features of the rear cover 108 (see FIG. 9). The commutator 128 functions to establish a consistent torque direction supplied by the motor.

The torque shaft 110 axially passes through the armature 124 and the commutator 128. As electric current passes through the wire windings of the armature, a torque is generated, due to the magnetic field generated by the permanent magnets 120 and 122, which drives rotation of the torque shaft 110.

Rotation of the torque shaft 110 is facilitated by a front bearing 140 and a rear bearing 142, both of which radially surround the torque shaft 110. The front bearing 140 is at least partially received in a recess 144 defined by the front cover 104. The rear bearing 142 is at least partially received in a cavity 146 (see FIG. 9) defined by the rear cover 108. The front bearing 140 is larger than the rear bearing 142, corresponding to the relative thickness of the torque shaft 110 at each location.

A biasing mechanism/rear biasing mechanism 150 is disposed within the cavity 146 (see FIG. 9) of the rear cover 108 and axially rearward of the rear bearing 142. Thus, in some examples, the cavity 146 (see FIG. 9) is large enough to house both the rear bearing 142 in its operational position, and the preloaded biasing mechanism 150. Non-limiting examples of the biasing mechanism 150 include a compression spring and a wave washer. The torque shaft 110 axially passes through the biasing mechanism 150.

The biasing mechanism 150 is resiliently compressible between an inner surface 152 of the rear cover 108 and the rear bearing 142. The biasing mechanism is thus adapted to apply a forwardly directed biasing force on the rear bearing 142. An axial preload force provided by the biasing mechanism 150 to the rear bearing 142 can be selected to optimize the rear bearing's operability and the front bearing's operability when the electric motor 100 is in the operating position shown in the Figures.

Figure 3:
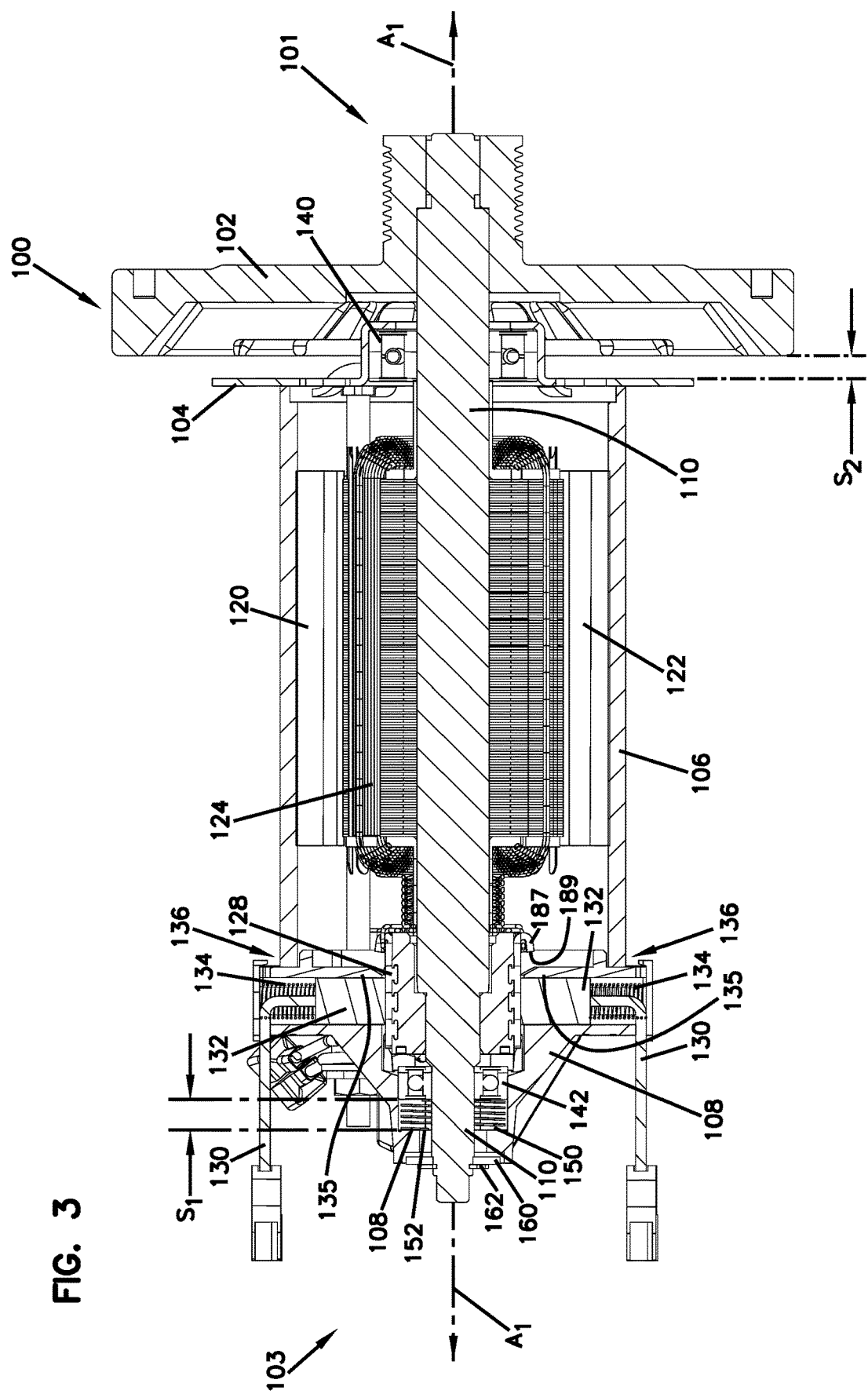
FIG. 3 is a cross-sectional view of the example DC electric motor of FIG. 1 along the line 3-3 in FIG. 2.
Figure 4:
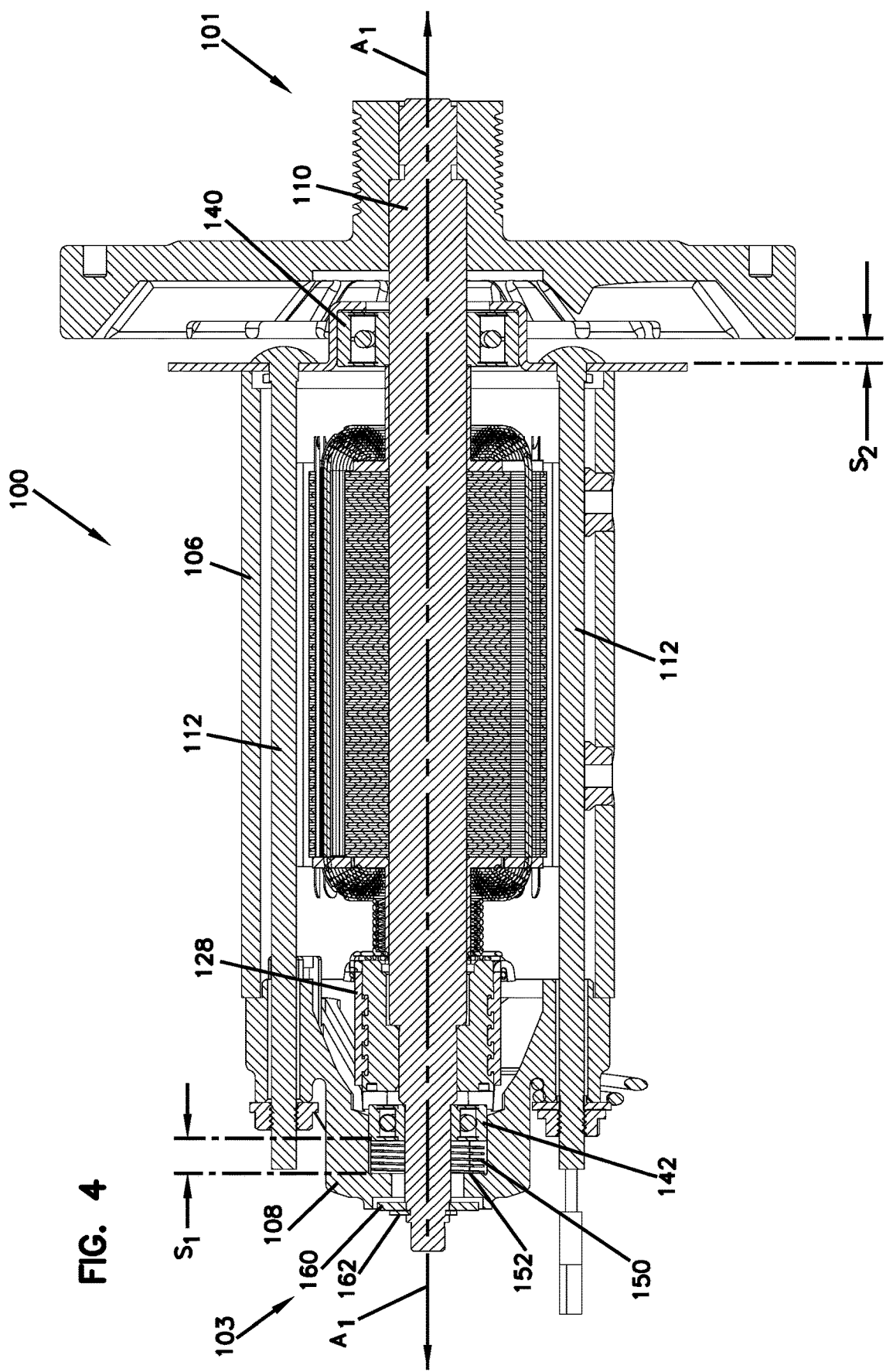
FIG. 4 is a cross-sectional view of the example DC electric motor of FIG. 1 along the line 4-4 in FIG. 2.
Figure 5:
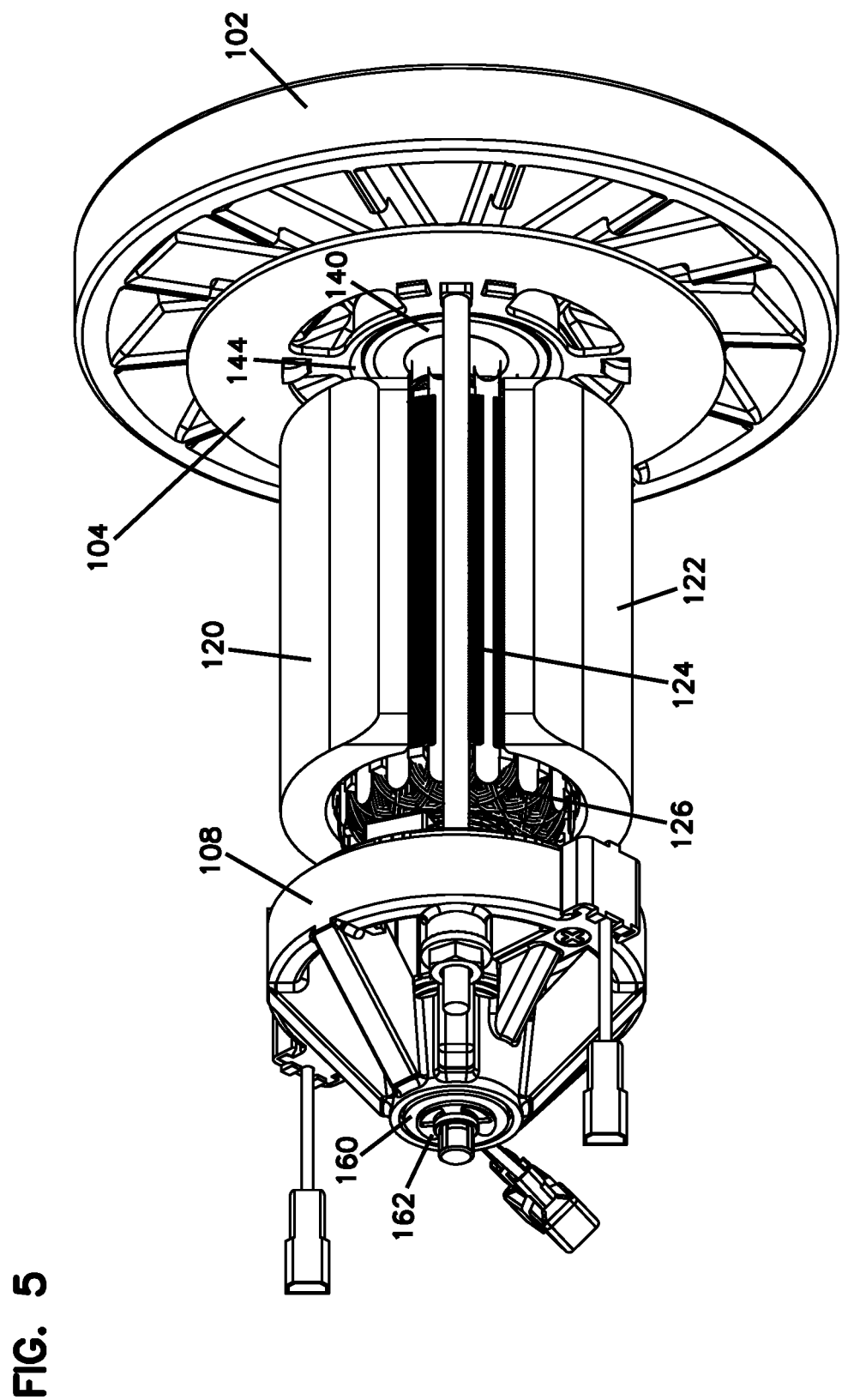
FIG. 5 is a partial assembly view of the example DC electric motor of FIG. 1.

Referring to FIG. 3, in the electric motor's 100 operating position as shown, there is a smallest axial spacing S2 between the front force dissipation component 102 and the front cover 104. In this position, there is a smallest axial spacing S1 between the rear bearing 142 and the inner surface 152 of the rear cover 108, which partially defines the cavity 146 (see FIG. 9). As shown, the biasing mechanism 150 is disposed in the volume partially defined by the spacing S1.

In at least some examples of electric motors in accordance with the present disclosure, the spacing S1 is larger than the spacing S2. In some non-limiting examples, the spacing S1 is at least 1.1 times, or at least 1.2 times, or at least 1.3 times, or at least 1.4 times, or at least 1.5 times, or at least 1.6 times, or at least 1.7 times, or at least 1.8 times, or at least 1.9 times, or at least 2.0 times, the spacing S2; however the ratio of the spacing S1 to the spacing S2 can be greater or smaller than these amounts.

In the event of an impact force on the electric motor 100 (e.g., the electric motor 100 is dropped) that results in an external force being applied to the electric motor 100 that is at least partially aligned with the direction of the arrow 115 in FIG. 1 ("a rearward impact force"), a rearward axial shifting, relative to the operating position shown in the Figures, of the shaft 110, and/or a corresponding rearward axial shifting of one or more components coupled to the shaft, such as the bearings 140 and 142, the armature 124, and the commutator 128, can occur.

Providing a spacing S1 can help to minimize damage to one or more parts of the motor resulting from a rearward impact force. For example, the spacing S1 allows the rear bearing 142 to axially travel rearwardly after impact without rearwardly striking the rear cover 108, which could cause the rear cover 108 to fracture or otherwise become damaged, particularly when the rear cover 108 is made from a thermoset material or the like. The spacing S1 also reduces the chances of damage to the rear bearing 142 from a rearward impact force.

The biasing mechanism 150 can provide a forward restorative force following a rearward impact force. Thus, the biasing mechanism 150 can force the rear bearing 142 to shift back to its operating position following a rearward impact force. Forward shifting of the rear bearing 142 can, in turn, force other shifted components that are coupled to the torque shaft 110, such as the commutator 128, the armature 124, the front bearing 140 and/or the front force dissipation component (e.g., flywheel) 102 to return to, or at least towards, their operating positions following a rearward impact force.

Providing a spacing S1 that is larger than a spacing S2 can also increase the impact resistance of the electric motor 100, particularly in response to a rearward impact force. Because the spacing S1 is smaller than the spacing S2, for a given rearward shifting of the torque shaft 110 in response to a rearward impact force, the front force dissipation component (e.g., flywheel) 102 can shift rearwards and contact the front cover 104 without the rear bearing 142 rearwardly contacting the rear cover 108. In addition, rearward contacting of the front cover 104 by the front force dissipation component 102 can serve to dissipate the rearward impact force through the front cover 104, particularly when the front cover is made from a strong, rigid material that is unlikely to break or give way from such an impact force, such as steel, which can further reduce damage to other parts of the electric motor 100.

The electric motor 100 can also be provided with one or more features to protect the motor from damage due to forward impact forces, i.e., forces aligned or partially aligned with the arrow 117 in FIG. 1.

Referring to FIGS. 8-11, in the example electric motor 100, the torque shaft 110 is defined by a back end 111 and a front end 113.

When the electric motor 100 is in its operating position, an axial portion 167 of the torque shaft 110 protrudes rearwardly through an opening 165 in the rear cover 108. The axial portion 167 includes an annular shoulder 166 radially surrounding the longitudinal axis of the torque shaft 110 and facing rearwards. Rearward of the annular shoulder 166 is an annular groove 168.

A rearward facing exterior annular shoulder 163 of the rear cover 108 radially surrounds the opening 165. An exterior recess 164 in the cover 108 extends from the back end of the cover 108 forwardly to the annular shoulder 163.

A rear force dissipation component 161 includes one or more shaft securing elements. In this example, the rear force dissipation component 161 includes a washer 160 and a snap E-ring 162. It should be appreciated that other elements can be substituted for one or both of the washer 160 and the E-ring 162 without departing from the principal function of the rear force dissipation component 161. Thus, the rear force dissipation component can be any structural component that couples to the shaft rearward of the rear cover. The rear force dissipation component can absorb an impact force applied to the motor when, e.g., the rear force dissipation component and the rear cover contact each other due to a shifting occasioned by the impact force. The rear force dissipation component can serve other purposes as well.

The hole of the washer 160 fits around the torque shaft 110 and abuts the annular shoulder 166. The washer 160 also abuts the annular shoulder 163 of the rear cover 108.

The snap E-ring 162 is adapted to snap into the annular groove 168 and abut or nearly abut the rear face of the washer 160.

It should be appreciated that the rear force dissipation component 161 can help to minimize forward shifting of the torque shaft 110 and other components of the motor in response to a forward impact force, thereby further increasing the impact resistance of the electric motor 100.

Figure 8:
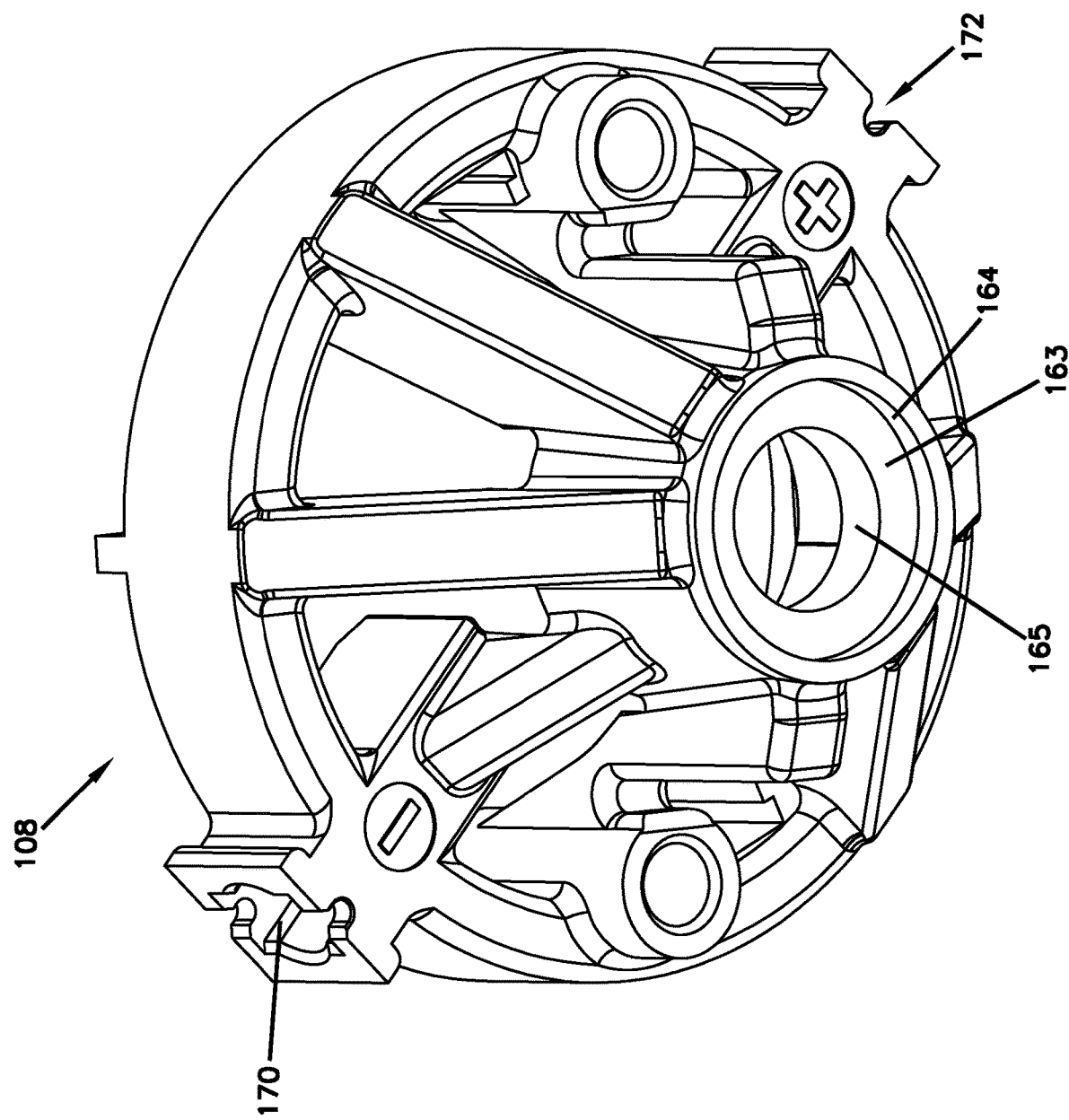
FIG. 8 is a perspective rear view of the rear cover of the example DC electric motor of FIG. 1.
Figure 9:
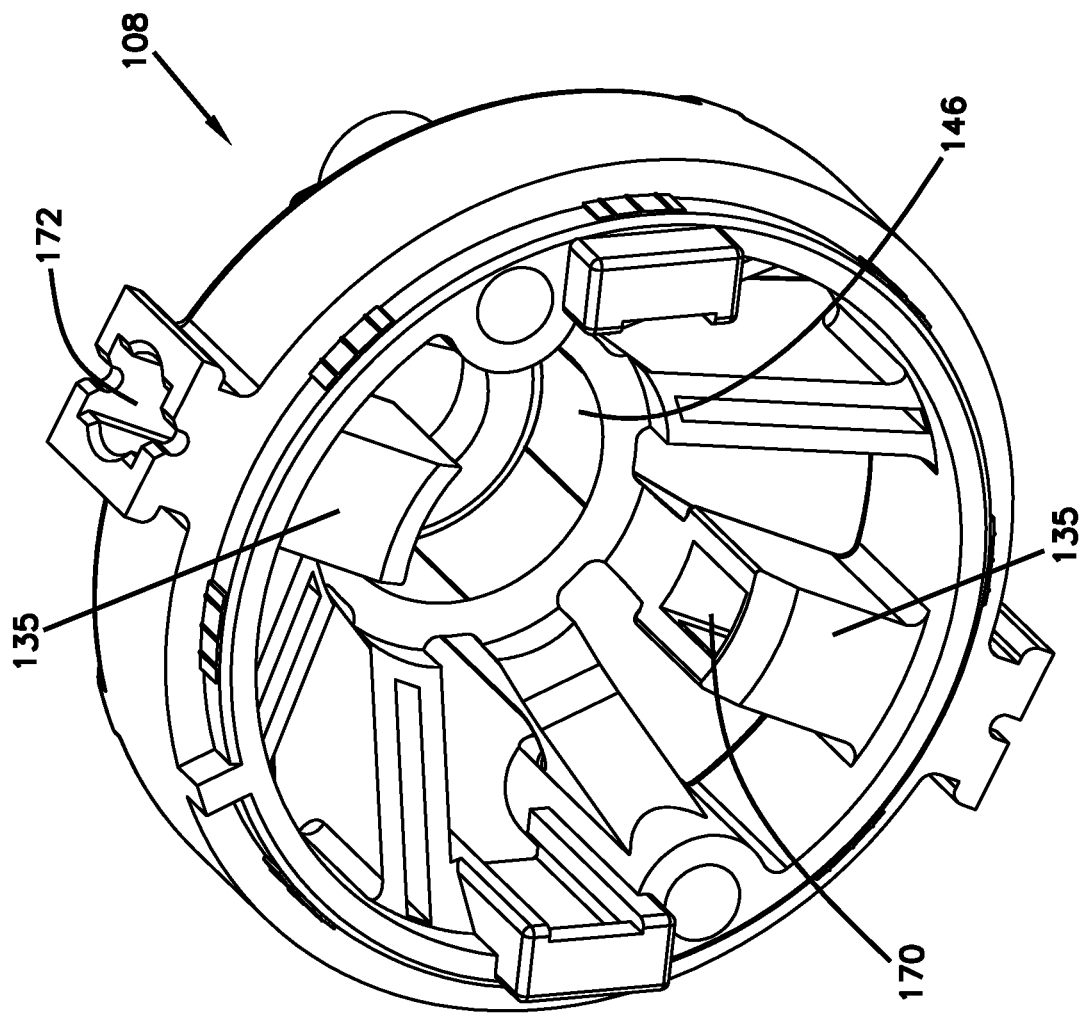
FIG. 9 is a perspective front view of the rear cover of FIG. 8.
Figure 10:
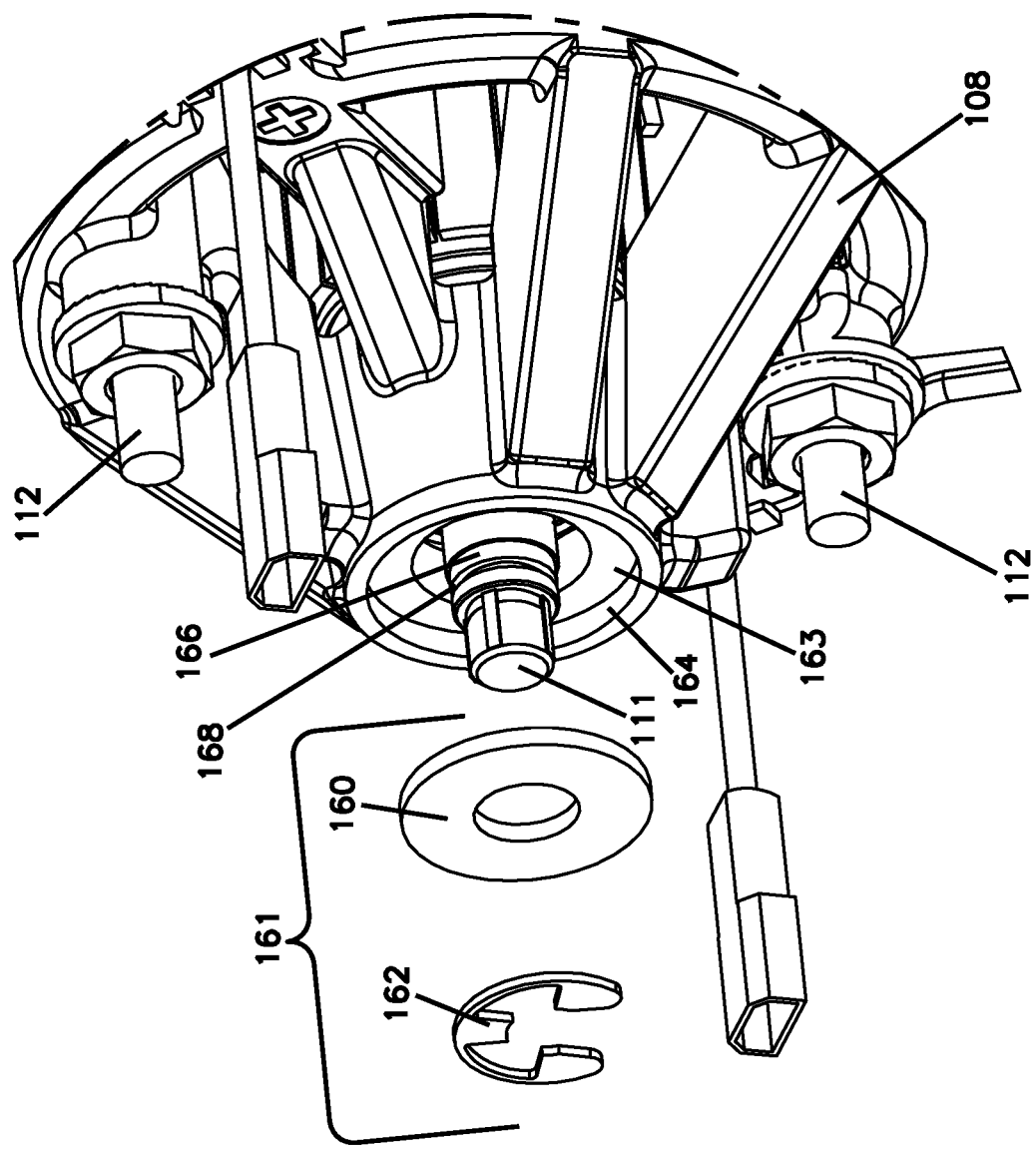
FIG. 10 is a partial, exploded view of a further partial assembly of the example DC motor of FIG. 1.
Figure 11:
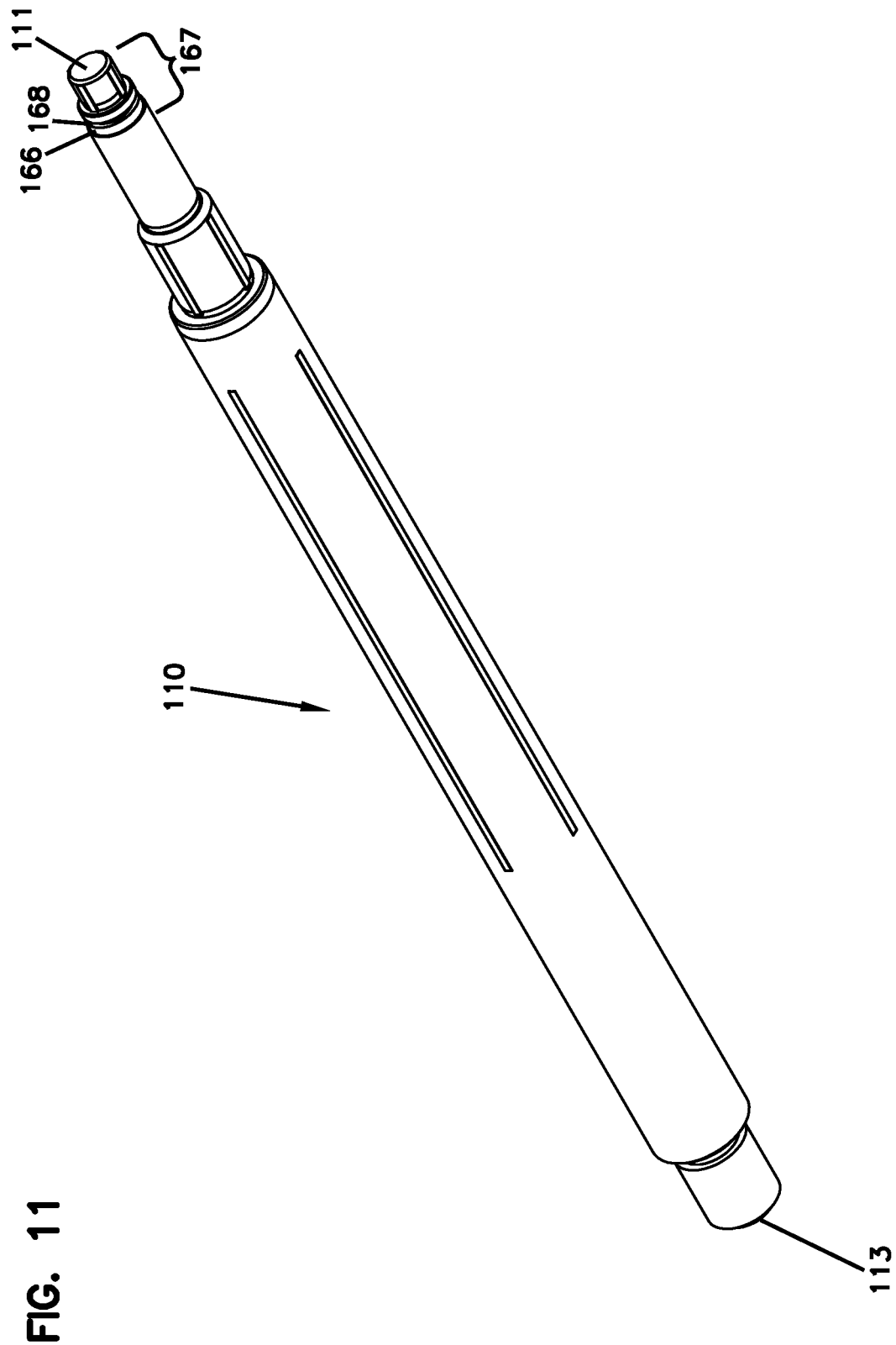
FIG. 11 is a perspective view of the torque shaft of the example DC electric motor of FIG. 1.

Referring to FIGS. 8 and 9, the brush holders 135 defined by the rear cover 108 include opposing receiving volumes 170 and 172 for receiving other components of the brush assemblies 136 described above, such as the brushes and springs.

Figure 6:
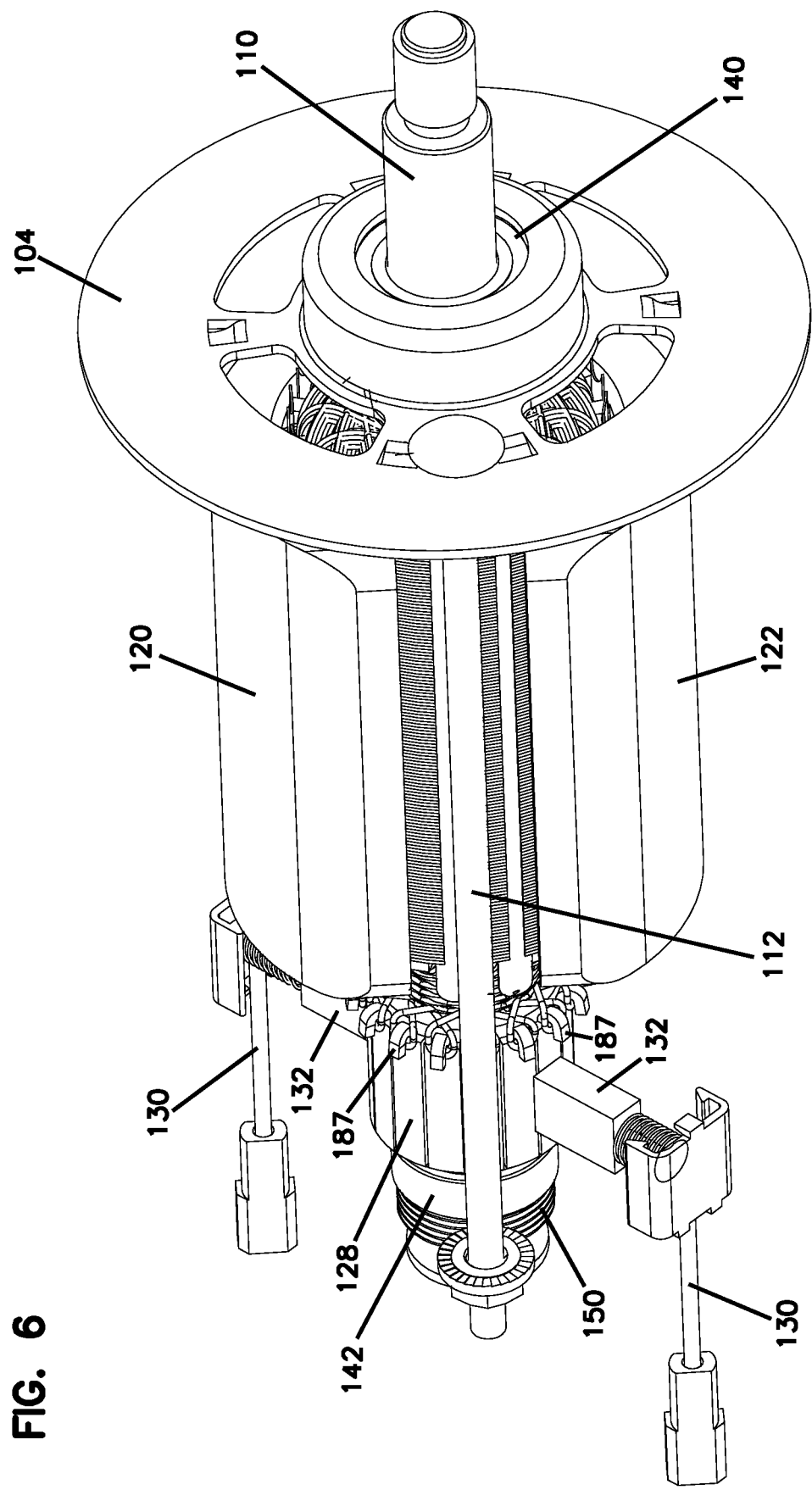
FIG. 6 is a further partial assembly view of the example DC electric motor of FIG. 1.
Figure 7:
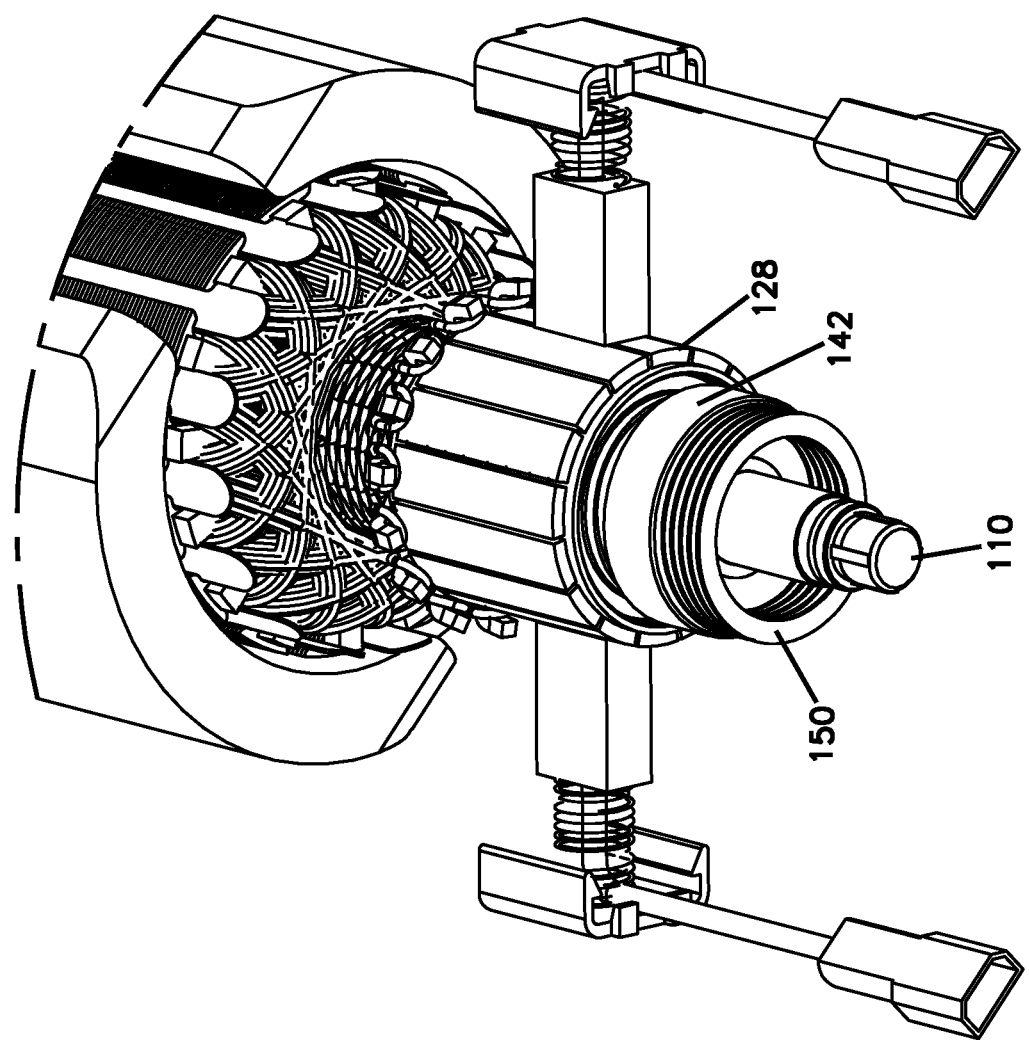
FIG. 7 is a partial view of a further partial assembly of the example DC electric motor of FIG. 1.
Figure 12:
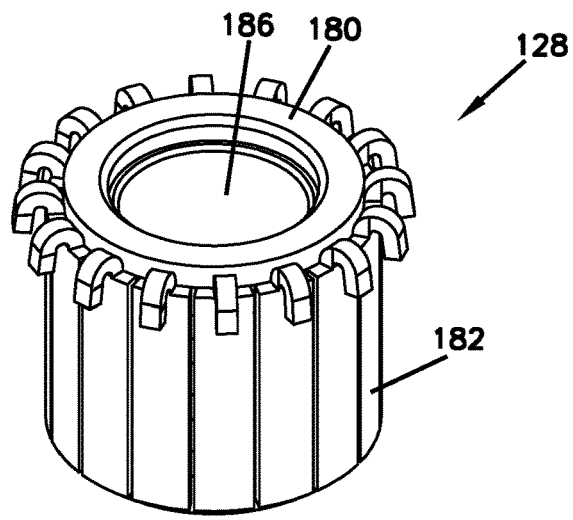
FIG. 12 is a perspective view of the commutator of the example DC electric motor of FIG. 1.
Figure 13:
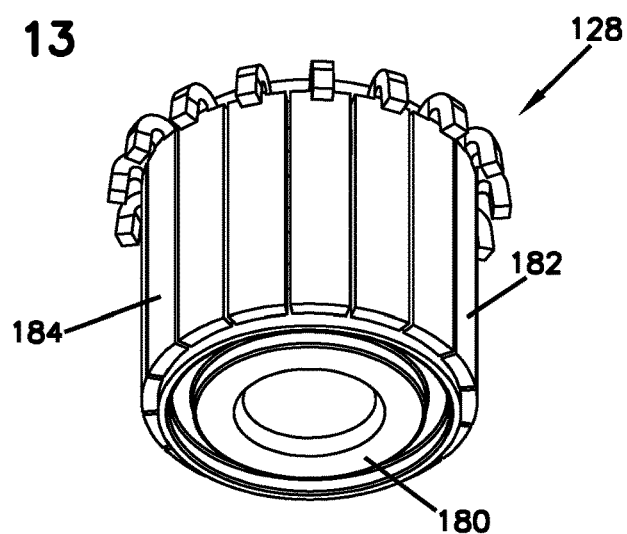
FIG. 13 is a further perspective view of the commutator of FIG. 12.
Figure 14:
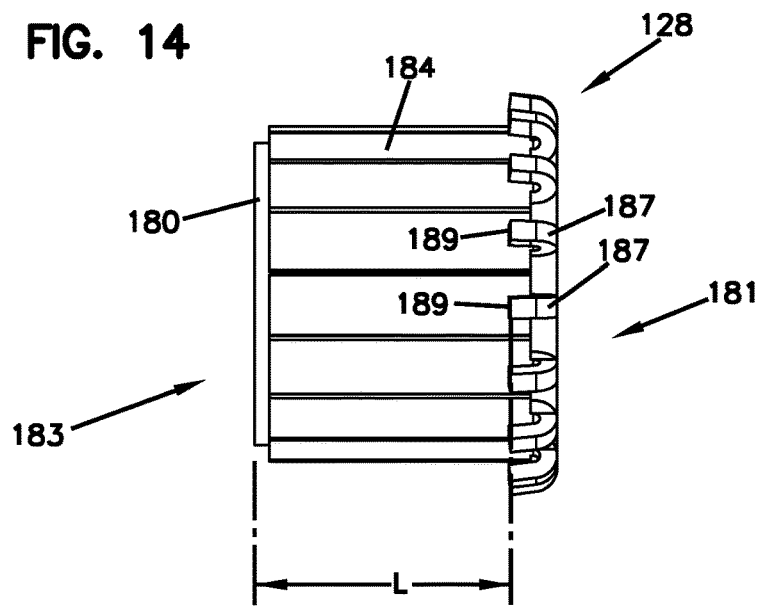
FIG. 14 is a side view of the commutator of FIG. 12.

Referring to FIGS. 12-14, the commutator 128 has a front 181 and a back 183, and includes a core 180 disposed within an outer shell 182, the core 180 being separable from the outer shell 182. The core 180 includes a bore 186 that receives the torque shaft 110 (FIG. 3). The outer shell 182 has an exterior surface 184 that engages the brushes 132 (FIG. 6). The outer shell 182 includes a plurality of tangs 187 disposed circumferentially and adapted to receive wire loops from armature windings (see FIG. 6).

The commutator 128 has a partial axial length L defined as the axial distance from the back end 183 of the commutator to the back end 189 of the tangs 187. In some examples, the partial axial length L can be selected to reduce the likelihood of the tangs 187 contacting (and thereby potentially damaging) the brush assemblies 136 (e.g., the brush holders 135 and/or the brushes 132) (FIG. 3) due to an axial shifting of the commutator 128 occasioned by, e.g., a forward or rearward impact force applied to the electric motor 100.

Similarly, the partial axial length L can be selected to maximize the chances of the brush assemblies 136 remaining radially aligned with the outer shell 182 of the commutator 128 rearward of the tangs 187 even upon an axial shifting of the commutator 128 occasioned by, e.g., a forward or rearward impact forced applied to the electric motor 100.

Thus, in some examples, the partial axial length L is selected such that the brush assemblies 136 are axially distanced from the back end 189 of at least one of the tangs 187 by as much as or more than the spacing S2. In some examples, the partial axial length L is selected such that the brush assemblies 136 are axially distanced from the back end 189 of at least one of the tangs 187 by as much as or more than the spacing S1.

Figure 15A:
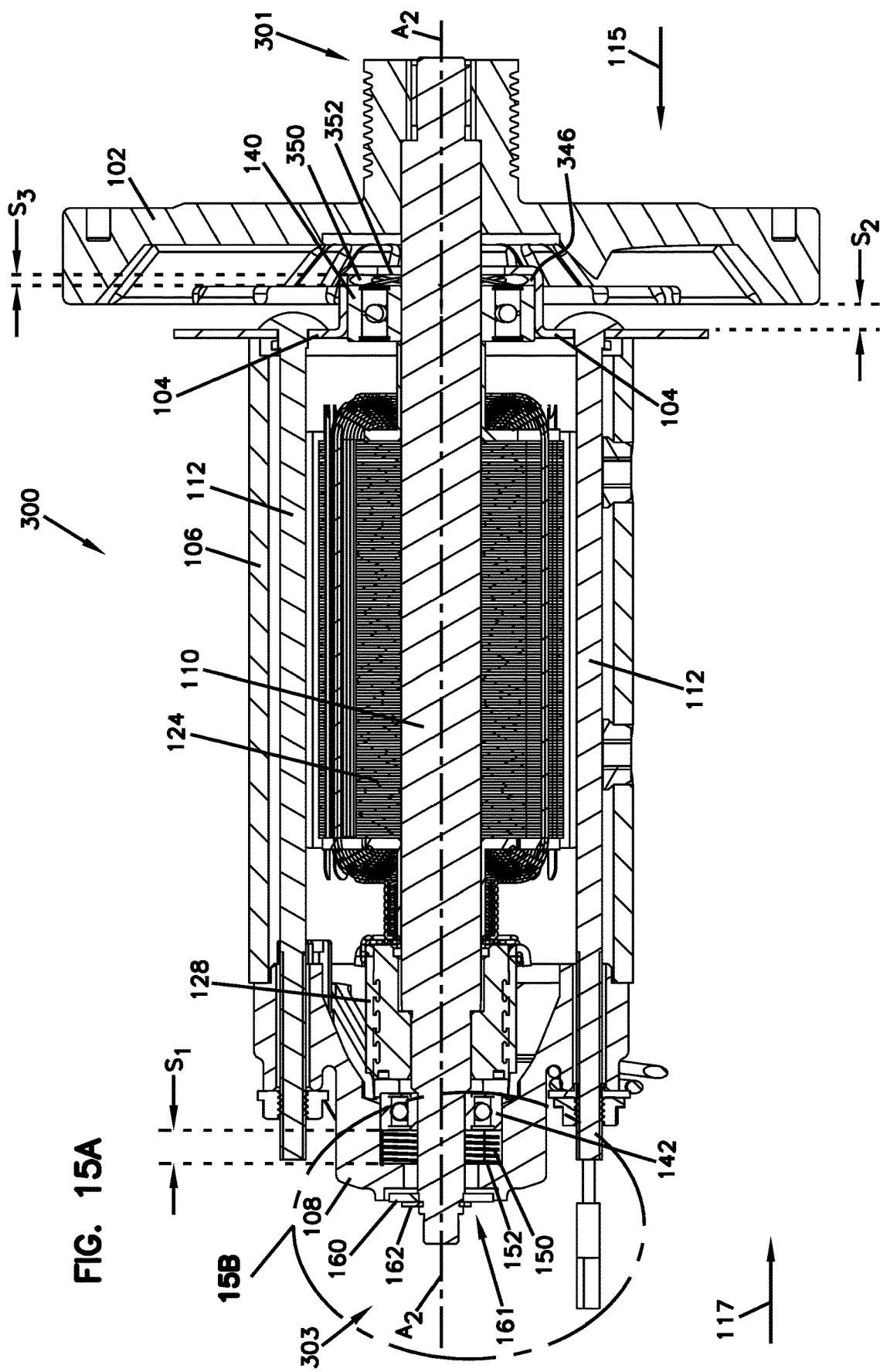
FIG. 15A is a cross-sectional view of a further example DC electric motor in accordance with the present disclosure, the motor being in an operational state.
Figure 15B:
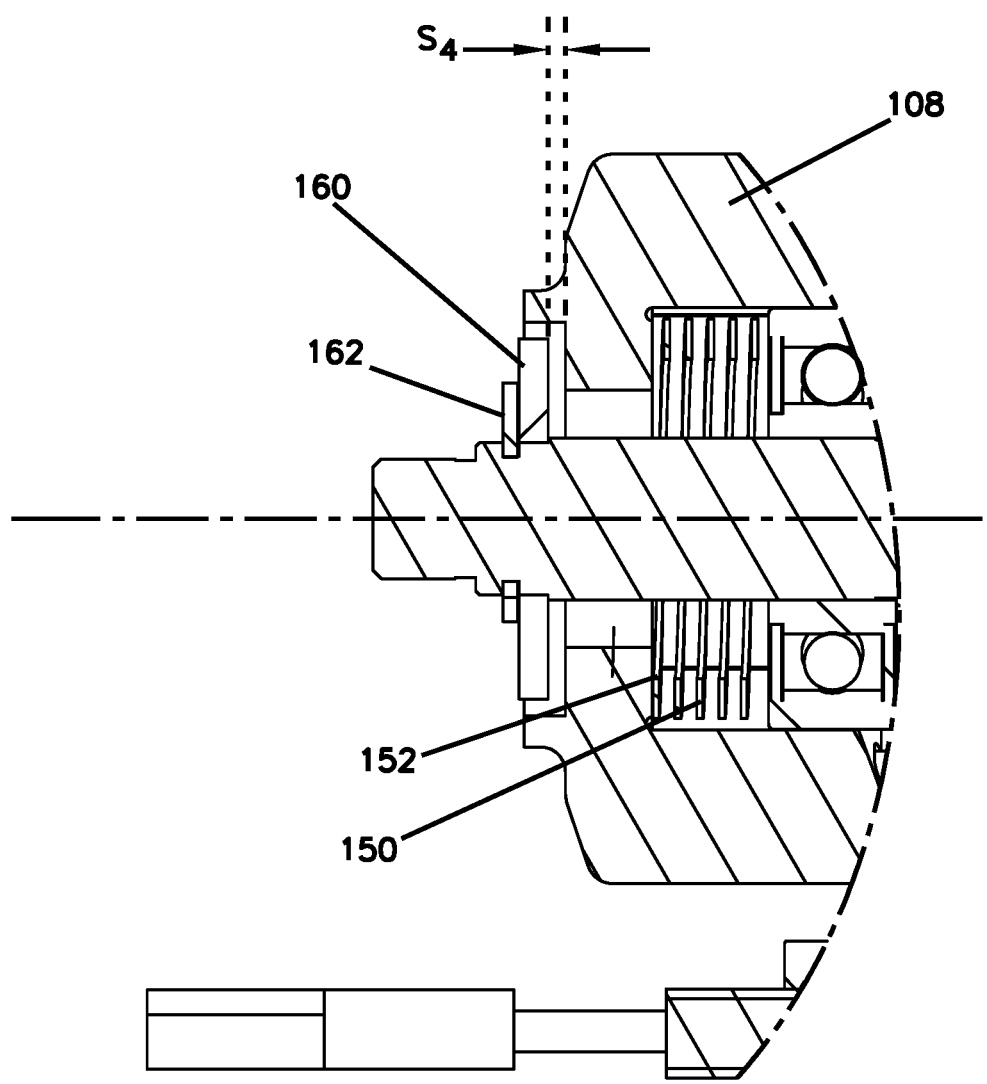
FIG. 15B is a view of the call-out portion of FIG. 15A.

Referring to FIGS. 15A and 15B (collectively, FIG. 15), a cross-sectional view of a further example DC electric motor 300 in accordance with the present disclosure is shown, the motor being in an operational state. The motor 300 has a front 301 and a back 303, and is defined by a rotation axis $A_2$ running through the front and back. The motor 300 includes many structural features in common with the motor 100 (as indicated, for example, by like reference numbers), and the following discussion will be limited to differences between the motor 300 and the motor 100. Thus, to the extent not inconsistent with the following discussion, the above description relating to the motor 100 is incorporated into this description of the motor 300.

As shown in FIG. 15, a biasing mechanism/front biasing mechanism 350 is disposed within the cavity 346 of the front cover 104 and axially forward of the front bearing 140. Thus, in some examples, the cavity 346 is large enough to house both at least a portion of the front bearing 140 in its operational position, and the preloaded biasing mechanism 350. Non-limiting examples of the biasing mechanism 350 include a compression spring and a wave washer. The torque shaft 110 axially passes through the biasing mechanism 350.

The biasing mechanism 350 is resiliently compressible between an inner surface 352 of the front cover 104 and the front bearing 140. The biasing mechanism 350 is thus adapted to apply a rearwardly directed biasing force on the front bearing 140. An axial rearward preload force provided by the biasing mechanism 350 to the front bearing 140 can be selected to optimize the front bearing's operability when the electric motor 300 is in an operating position, such as the position shown in FIG. 15.

In the electric motor's 300 operating position as shown, there is a smallest axial spacing S4 between the rear force dissipation component 161 and the rear cover 108. In this position, there is a smallest axial spacing S3 between the front bearing 140 and the inner surface 352 of the front cover 104, which partially defines the cavity 346. As shown, the biasing mechanism 350 is partially disposed in the volume partially defined by the spacing S3. In some examples, a rear portion of the front bearing 140 can extend axially rearward beyond the cavity 346.

In at least some examples of electric motors in accordance with the present disclosure, including but not limited to the electric motor 300, the spacing S3 is larger than the spacing S4. In some non-limiting examples, the spacing S3 is at least 1.1 times, or at least 1.2 times, or at least 1.3 times, or at least 1.4 times, or at least 1.5 times, or at least 1.6 times, or at least 1.7 times, or at least 1.8 times, or at least 1.9 times, or at least 2.0 times, the spacing S4; however the ratio of the spacing S3 to the spacing S4 can be greater or smaller than these amounts.

In the event of an impact force on the electric motor 300 (e.g., the electric motor 300 is dropped) that results in an external force being applied to the electric motor 300 that is at least partially aligned with the direction of the arrow 117 in FIG. 15 ("a forward impact force"), a forward axial shifting, relative to the operating position shown in FIG. 15, of the shaft 110, and/or a corresponding forward axial shifting of one or more components coupled to the shaft, such as the bearings 140 and 142, the armature 124, and the commutator 128, can occur.

Providing a spacing S3 can help to minimize damage to one or more parts of the motor resulting from a forward impact force. For example, the spacing S3 allows the front bearing 140 to axially travel forwardly after impact without forwardly striking the front cover 104.

In addition, the biasing mechanism 350 can provide a rearward restorative force following a forward impact force. Thus, the biasing mechanism 350 can force the front bearing 140 to shift back to its operating position following a forward impact force. Rearward shifting of the front bearing 140 can, in turn, force other shifted components that are coupled to the torque shaft 110 to return to, or at least towards, their operating positions following a forward impact force.

Figure 16:
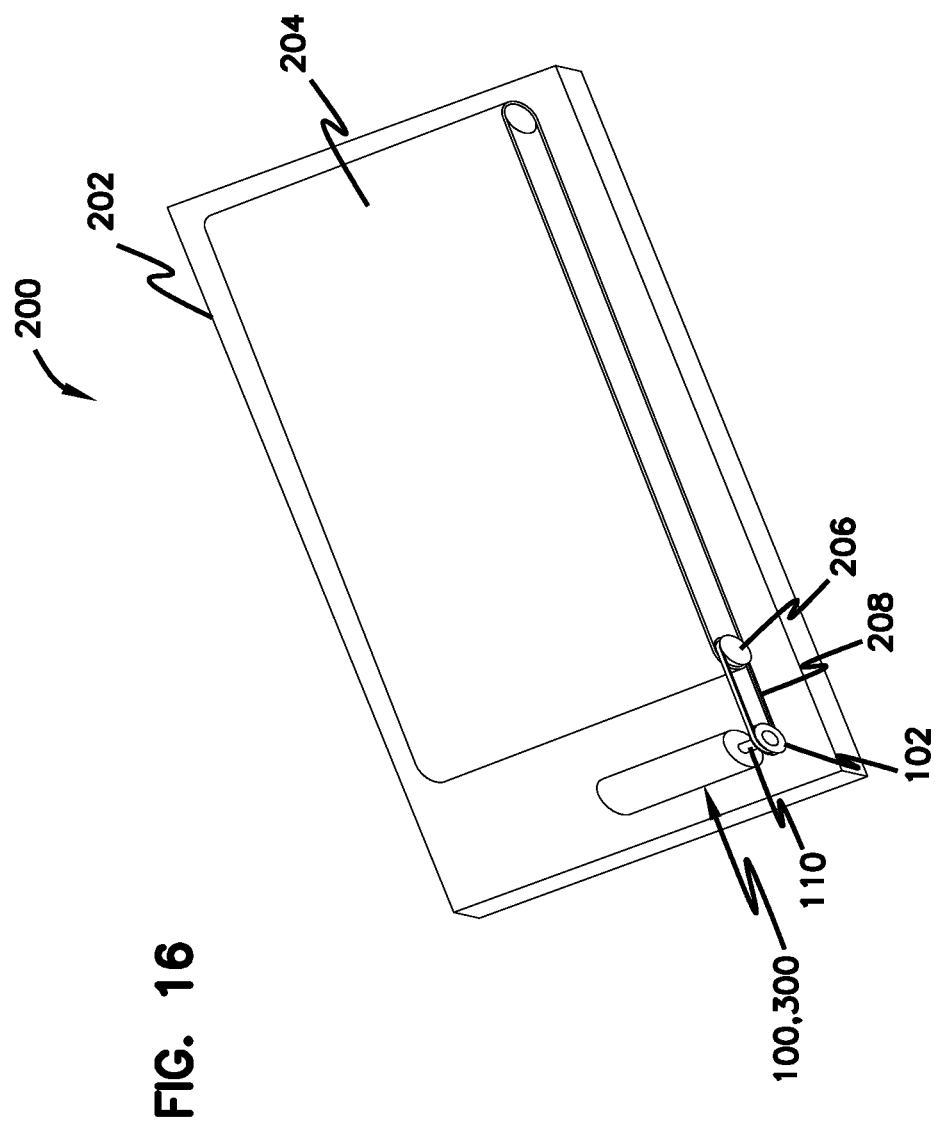
FIG. 16 is a perspective view of a part of an example treadmill with an upper cover removed to schematically show a motor in accordance with the present disclosure installed in the treadmill.

Referring to FIG. 16, a portion 200 of an example treadmill is illustrated, including an example electric motor 100, 300 as described above, but schematically depicted in FIG. 16.

The treadmill generally includes a frame 202 and a treadmill belt 204 on which an individual can walk or run. The treadmill belt 204 is driven by a drive roller 206 that is, in turn, coupled by a drive belt 208 to a pulley of an assembly including a flywheel 102. In this arrangement, torque from the electric motor 100, 300 is transferred radially from the flywheel assembly to the drive roller 206 of the treadmill by the drive belt 208.

Although in the foregoing description, terms such as "front," "forwards," "back"/"rear," etc., were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. An electric motor, comprising:
    a front cover;
    a rear cover;
    a housing disposed between the front cover and the rear cover;
    an armature disposed in the housing;
    a shaft rotatably mounted about a rotation axis of the electric motor that passes through the front cover and the rear cover, the shaft being coupled to a front force dissipation component positioned forward of the front cover;
    a front bearing radially surrounding the shaft;
    a rear bearing radially surrounding the shaft; and
    a biasing mechanism disposed rearward of the rear bearing such that axial rearward movement of the rear bearing causes compression of the biasing mechanism between the rear bearing and the rear cover;
    wherein the electric motor defines a first spacing defined as a smallest axial distance between the rear bearing and the rear cover rearward of the rear bearing, and a second spacing defined as a smallest axial distance between the front force dissipation component and the front cover, the first spacing being greater than the second spacing.

2. The electric motor of claim 1, wherein the biasing mechanism is a compression spring.

3. The electric motor of claim 1, wherein the biasing mechanism is disposed in a cavity defined by the rear cover.

4. The electric motor of claim 1,
    wherein one or more components of the electric motor has an operating position and an axially shifted position; and
    wherein the biasing mechanism is adapted to return one or more of the components to the operating position from the shifted position.

5. The electric motor of claim 4, wherein the biasing mechanism applies a pre-load force on the rear bearing when the rear bearing is in an operating position.

6. The electric motor of claim 1, wherein the electric motor is a permanent magnet direct current motor, and wherein the front force dissipation component comprises a flywheel.

7. An electric motor, comprising:
    a front cover;
    a rear cover;
    a housing disposed between the front cover and the rear cover;
    an armature disposed in the housing;
    a shaft rotatably mounted about a rotation axis of the electric motor that passes through the front cover and the rear cover, the shaft being coupled to a front force dissipation component positioned forward of the front cover;
    a front bearing radially surrounding the shaft; and
    a rear bearing radially surrounding the shaft;
    wherein the electric motor defines a first spacing defined as a smallest axial distance between the rear bearing and the rear cover rearward of the rear bearing, and a second spacing defined as a smallest axial distance between the front force dissipation component and the front cover, the first spacing being greater than the second spacing;
    wherein the electric motor further comprises a commutator and one or more brush assemblies, each of the one or more brush assemblies including a brush engageable with an exterior surface of the commutator and a brush holder that receives the brush; and
    wherein a partial axial length of the commutator between a back end of the commutator and a back end of at least one of a plurality of tangs of the commutator and parallel to the rotation axis is selected such that the one or more brush assemblies are not engaged by any of the plurality of tangs when the commutator axially shifts rearwards by up to a predefined nonzero distance.

8. An electric motor, comprising:
    a front cover;
    a rear cover;
    a housing disposed between the front cover and the rear cover;
    an armature disposed in the housing;
    a shaft rotatably mounted about a rotation axis of the electric motor that passes through the front cover and the rear cover, the shaft being coupled to a front force dissipation component positioned forward of the front cover;
    a front bearing radially surrounding the shaft; and
    a rear bearing radially surrounding the shaft;

wherein the electric motor defines a first spacing defined as a smallest axial distance between the rear bearing and the rear cover rearward of the rear bearing, and a second spacing defined as a smallest axial distance between the front force dissipation component and the front cover, the first spacing being greater than the second spacing;

wherein the electric motor further comprises a commutator and one or more brush assemblies, each of the one or more brush assemblies including a brush engageable with an exterior surface of the commutator and a brush holder that receives the brush; and wherein a partial axial length of the commutator between a back end of the commutator and a back end of at least one of a plurality of tangs of the commutator and parallel to the rotation axis is selected such that the one or more brush assemblies are axially distanced from the back end of the at least one of a plurality of tangs by more than the second spacing.

* * * * *